United States Patent [19]

Yungclas

[11] Patent Number: 4,516,541
[45] Date of Patent: May 14, 1985

[54] INTERNAL COMBUSTION ENGINE WITH SUPERCHARGER

[76] Inventor: James A. Yungclas, E. Friendship Haven, Room 120, Fort Dodge, Iowa 50501

[21] Appl. No.: 511,581

[22] Filed: Jul. 7, 1983

[51] Int. Cl.³ .............................................. F02B 33/22
[52] U.S. Cl. .............................. 123/70 R; 123/196 W
[58] Field of Search ............. 123/56 R, 56 A, 56 AA, 123/56 B, 56 BA, 70 R, 196 W; 60/624

[56] References Cited

U.S. PATENT DOCUMENTS

| | | | |
|---|---|---|---|
| 1,077,956 | 11/1913 | Fox | 123/70 R |
| 3,037,582 | 6/1962 | Egloff et al. | 123/196 W |
| 3,043,283 | 7/1962 | Vitale | 123/70 R |
| 4,019,324 | 4/1977 | Coxon | 60/624 |

Primary Examiner—Craig R. Feinberg

[57] ABSTRACT

An internal combustion engine adapted to be mounted on a vertical axis. The engine is preferably a two-cycle engine having a positive displacement supercharger operating on the same crankshaft as the engine and includes a flywheel mounted on double-throw arm between the bank of engine cylinders on one side and the supercharger cylinders on the other side. Provision is also made for the use of an auxiliary turbine device to use exhaust gases to augment the power developed by the engine.

2 Claims, 1 Drawing Figure

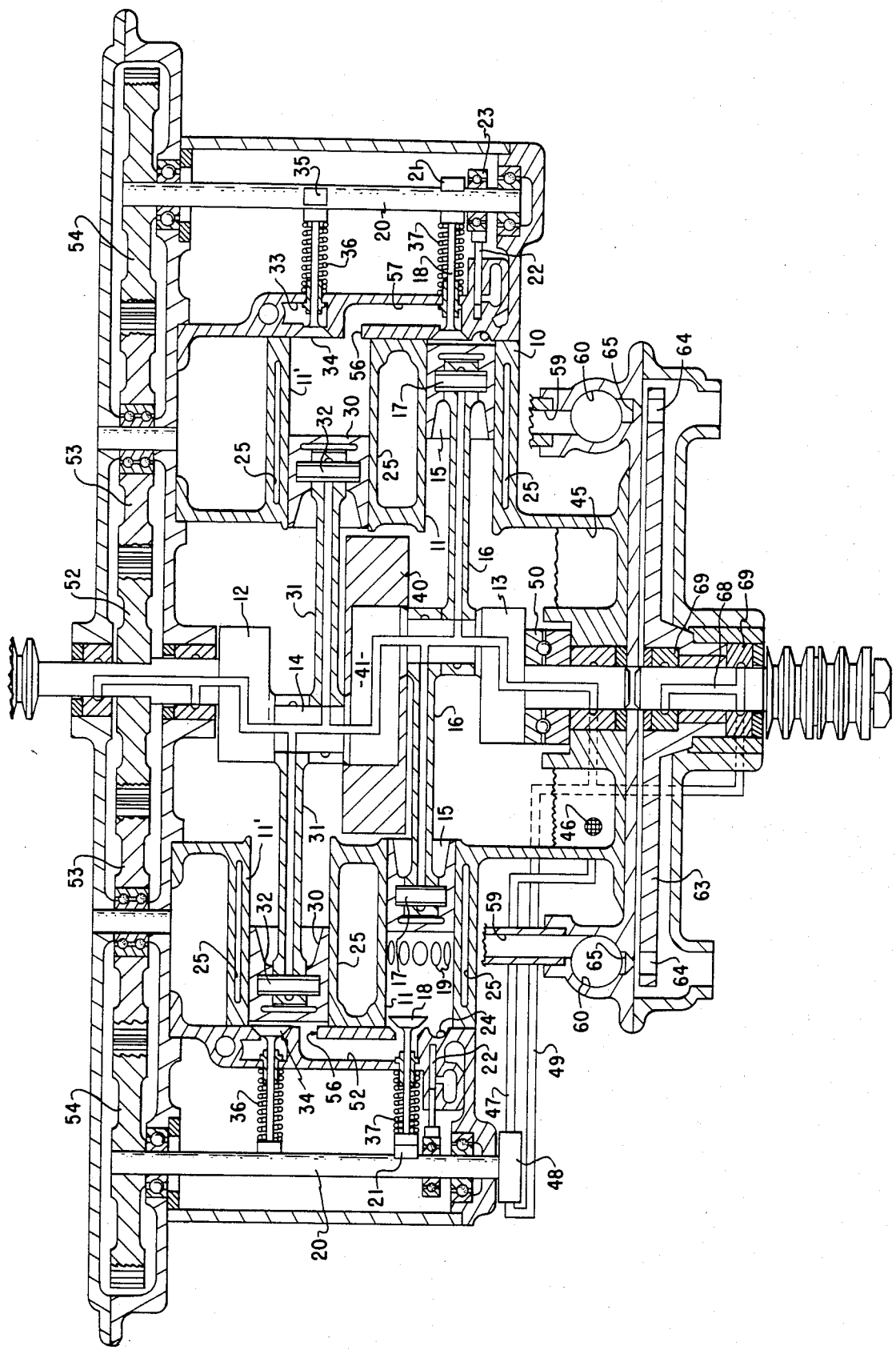

INTERNAL COMBUSTION ENGINE WITH SUPERCHARGER

BACKGROUND AND SUMMARY OF THE INVENTION

This invention pertains to internal combustion engines, and more particularly to a supercharged engine having a positive displacement supercharger operating on the same crankshaft as the power cylinders.

Internal combustion engines are currently used in a great many sizes and applications. Sizes range from the very small such as may be used to power model aircraft and other such model devices, through those used for powering bicycles (or mopeds) and powered chain saws, to lawn mowers, ultra-lite aircraft, motorcycles up to the very large engines which are still used for stationary use in the generation of electrical power.

The engine under consideration in this application may be of relatively small size ranging from one which might be used for lawn mowers up to a unit for an automobile or other devices requiring engines of similar size, although the desirable features may be adapted to a fairly wide range of sizes of engine. The engine is designed to be very compact and very efficient. Efficiency is gained by the use of fuel injection, a supercharger and possibly an exhaust turbine. Compactness is accomplished by unique placement of the flywheel between the power cylinders and the supercharger cylinders.

Putting the flywheel on the double-throw crank arm between the power cylinders and the supercharger cylinders greatly reduces the overall strain on the crankshaft. The flywheel absorbs power from the power cylinders and uses it to operate the positive displacement supercharger cylinders without applying the combined torque load on the entire crankshaft.

FIGURES

The FIGURE is a cross-sectional view of the engine and supercharger.

DESCRIPTION

Briefly this invention comprises a very compact and efficient internal combustion engine particularly adaptable to sizes suitable in the range from lawn mower engines up to those usable for automobiles, trucks and locomotives, although the principal benefits may be achieved by the compactness gained in the medium sized engines.

More particularly and referring to the drawings, the engine is enclosed in a cylinder block and crankcase unit 10. The entire engine is operated from a single crankshaft 12 having one throw 13 for the power unit and a second throw 14 for the supercharger unit.

The power unit consists of two opposed power cylinders 11 in which the power pistons 15 operate. The pistons 15 are connected to the power throw 13 of the crankshaft by the customary connecting rods 16 journalled on the throw 13 and on wrist pins 17 in the pistons.

The illustrated and preferred engine is a two-stroke cycle engine and is provided with the intake valves 18 rather than ports for proper entry of the air and outlot ports 19 to provide for scavenging of the burnt gases. The intake valves 18 are operated from overhead cam shafts 20 at each end of the engine through cams 21 on the shaft.

Fuel is injected into the engine by standard type injectors operated from the cam shafts 20, and may be built into the engine by using pistons 22 engaged by cams 23 on those cam shafts 20.

Ignition in the illustrated engine is provided by the use of glow plugs 24 in a manner well known in the art.

The illustrated power section is not meant to show an exclusive embodiment, although it is preferred. It will become apparent as the embodiment is described that the invention may also be adapted to a four-stroke cycle engine as well as to the two-stroke engine which is illustrated, although the two-stroke cycle is much preferred. Also, an engine using spark plug ignition rather than glow plugs may readily be used. The mode of cooling is also optional. The illustrated engine uses liquid cooling with the cooling medium coming from the bottom of a radiator (not shown) and entering the bottom of the power cylinder jackets and returning to the top of the radiator from the top of the supercharger jacket. The cooling medium flows through jacket openings 25, but air cooling with finned cylinders and a cooling fan is also appropriate and is within the ability of any mechanic skilled in the art. Similarly, use of a carburetor to form a fuel-air mixture to be inserted into the cylinders 11 through the supercharger is not totally ruled out. However, it is preferred to use a fuel injection to the combustion chamber to avoid having the fuel-air mixture become heated in the supecharger section of the engine.

The intake section of the engine includes a positive displacement supercharger which, in effect, supercharges each cylinder separately. The supercharger cylinders 11' lie parallel and adjacent to the power cylinders 11. Supercharger pistons 30 operate in these cylinders 11' and are connected to the supercharger throw 14 of the crankshaft through suitable connecting rods 31 journalled on the crankshaft and wrist pins 32. Normally the supercharger displacement would be somewhat greater than that of the power cylinders because the air into the power cylinders would be compressed.

Air enters the engine through the customary cleaner and is ducted into chambers 33 in the head end of the supercharger cylinders 11'. Movement of the air into the cylinder 11' is controlled by an intake valve 34 in each cylinder. The opening of this valve is controlled by a cam 35 on the camshaft 20. A spring 36 biasses the valve to the closed position so that unless the cam 35 is holding it open, the valve is under spring pressure to keep it closed. Movement of the compressed air from each supercharger cylinder 11' to the power cylinder 11 is controlled only by the intake valve 18 in each power cylinder. The valve 18 when closed seals the power cylinder during the compression-power stroke. It opens against the biassing force of springs 37 when the pressure is reduced so that the pressurized air from the supercharger overcomes that force and is blown into the cylinder to scavenge the charge and provides new air for the next combustion cycle.

Contributing to the compactness of the engine is the placement of the flywheel 40 between the cylinder banks. It is apparent that this weight can be fastened to the crankshaft 12 either in a straight separate portion of the shaft, or preferably, on the interior crank arm 41 between the power throw 13 and the supercharger throw 14. This preferred mounting substantially reduces the required length of the crankshaft 12, camshafts 20 and of the cylinders block, thus reducing the space requirement for the engine.

Any suitable lubrication system may be used. For the purpose of illustration in the FIGURE I have shown an engine having a vertical axis. By mounting the engine this way, the static weight of the rotating parts of the engine including the crankshaft, flywheel and other parts connected to the crankshaft is transferred to a ball-type thrust bearing 50 and thus relieves the crankshaft main bearings from carrying that weight. In the illustrated engine it is convenient to provide a sump 45. An outlet 46 from the sump feeds a line 47 running to an oil pump 48 of any acceptable cycle. From the pump, a line 49 carries the oil to the engine block from where it is distributed to the various parts of the engine particularly to the piston wrist pins from which excess oil lubricates the cylinder walls by conventional means.

The oil pump 48 is driven from one of the two camshafts 20. These camshafts in turn are driven from the crankshaft 12 through a gear train driven first by a gear 52 on the crankshaft. This gear drives an idler 53 in each of the two gear trains. The idler in turn drives a gear 54 on each camshaft. The first gear 52 and the cam gear 54 are the same size so that the camshaft 20 turns at the same rate as the crankshaft. It will be obvious to those skilled in the art that the shafts 20 could be driven with either a chain device or a belt drive using a belt having positive engagement with a proper sprocket on each shaft.

Numerous changes may be possible. For example:

1. By using heavy duty aluminum alloy pistons on the supercharger and heavy duty cast iron pistons on the power unit, all four sets of pistons and rods could be of identical weights, or 2. Three of the supercharger cylinder-power cylinder assemblies could be mounted at 120° intervals to do the work of a conventional V6 four cycle engine of the same displacement with turbo-charging. Such modifications are well within the ability of those skilled in the art.

In order to augment the efficiency of the engine I propose also the possible use of a turbine to take advantage of any energy remaining in the exhaust gases from the engine. As noted earlier, the intake air comes into the compressor cylinders 11' through an intake valve 34. From that cylinder, the compressed air flows through an exhaust port 56 and through a passageway 57 leading to the intake valves 18 on the power cylinders 11. After being used in the power cylinders to provide combustion, the scavenging air and combustion gases are exhausted through the ports 19 into manifolds not shown. The manifolds direct the gases into exhaust ducts 59, and from these into an optional turbine intake manifold 60.

A turbine wheel 63 is fixed to a separate shaft 68 concentric with the crankshaft and journalled in bearings 69. The turbine wheel is formed with a series of turbine blades 64 adjacent to nozzles 65 through which the exhaust gases are led from the manifold 60. Thus, the exhaust gas from the nozzle 65 impinges on the blades 64 adding energy which may be taken off through pulleys or gears mounted on the shaft 68. From the nozzles 65 the gases may be exhausted to atmosphere or may be directed away through a manifold and muffler (not shown) in a manner well known in the art.

The exhaust turbine may be a separate unit. Mounting it below the engine makes it convenient to connect the four exhaust ports on the engine to the circular receiver on the top of the turbine case. Jet nozzles 65 in the bottom of the receiver direct the steam against the blades 64 on the circumference of the turbine rotor.

Power from the engine without the turbine can be taken off at either end of the crankshaft 12. However, I prefer to use a mounting in which the power transmission is from the upper end of the shaft. In the embodiment with the turbine, this arrangement is necessary. This transmission may be through pulleys 67 as shown but might also be through a chain and sprocket arrangement or through a gear box or by direct drive as will readily be apparent. The reason for the preference in using the upper end as the drive is that it is relatively easier to seal the lower end of the shaft and the lower bearing if the shaft 12 is not extended beyond the lower part of the crankcase enclosure 10.

The turbine is of little value except in using blended enthanol fuel where the exhaust gases are 50% to 70% superheated steam of probably fifteen pounds pressure per square inch. This steam provides a source of considerable power.

It will be apparent from the foregoing description that I have provided a compact and efficient power unit particularly useful for moderate size power requirements, but adaptable to use in both smaller sizes and for use in passenger cars, trucks and locomotives.

I claim as my invention:

1. An internal combustion engine including a crankcase, at least two opposed power cylinder and piston assemblies and two opposed supercharger cylinder and piston assemblies mounted in said crankcase, a single crankshaft journalled on a vertical axis in said crankcase, piston means in each of said cylinders each piston having a connecting rod, said crankshaft having a single power throw on which both power piston connecting rods are journalled and a single second throw on which both supercharger piston connecting rods are journalled, a flywheel fixed on said crankshaft between said power throw and said second throw, means for admitting air into said supercharger cylinders and means for conducting compressed air from each supercharger cylinder to its adjacent power cylinder, means for injecting fuel into said power cylinder, ignition means for igniting said fuel and timing means for properly sequenced timing of the entrance and exhaust of fuel and gases into and from said cylinders and for ignition within said power cylinders, a sump for lubricating material formed in said crankcase at its lower part, pump means communicating with said sump to pump said lubricating material from said sump throughout means in said engine to distribute said material, a turbine wheel journalled in said crankcase coaxially with said crankshaft, means for conducting exhaust gases from said power cylinder to said turbine wheel and guide means adjacent said wheel to direct said exhaust gases to impinge on said wheel.

2. The device of claim 1 in which said engine is oriented with a vertical axis of the crankshaft and said turbine wheel lies below the engine, said exhaust gas being directed against the turbine wheel through nozzles in said case.

* * * * *